Nov. 7, 1944.  W. S. MASON  2,362,287
PISTON RING
Filed Nov. 12, 1942

INVENTOR
William S. Mason

Patented Nov. 7, 1944

2,362,287

UNITED STATES PATENT OFFICE 2,362,287

PISTON RING

William S. Mason, Chicago, Ill.

Application November 12, 1942, Serial No. 465,328

6 Claims. (Cl. 309—45)

This invention relates to piston rings, and more particularly to oil control rings such as are disclosed in my copending application having Ser. No. 439,683 dated April 20, 1942.

The principal object of my invention is to provide an oil control ring having extremely wide oil receiving channel, and means providing free oil drainage to the bottom of the groove in the piston.

Another object is to provide a ring which will seal the side walls of the groove and have means for lubricating the side walls of the piston ring groove to reduce wear and improve sealing action of the rings.

Several further objects are to provide a ring which is cheap to manufacture, easy to install, efficient in operation, light in weight, and tends to conform to the shape of the wall of the cylinder.

Other objects and advantages will be brought out in the specification and claims wherein they will be more readily apparent when read in conjunction with the accompanying drawing, wherein:

Figure 1:
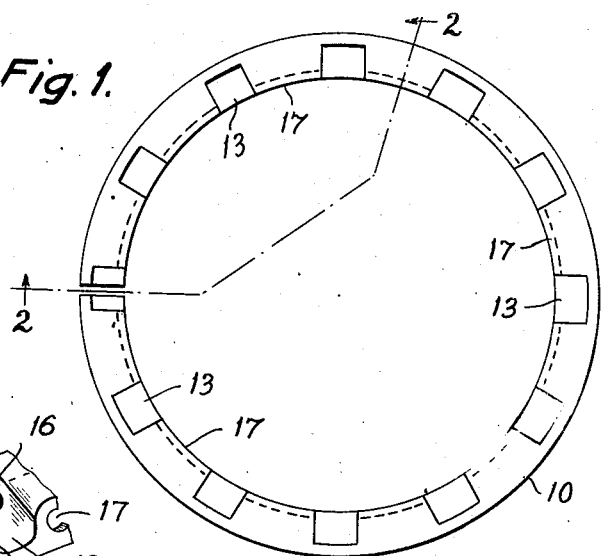
Figure 1 is a top view of a ring constructed according to the present invention.
Figures 2, 3:
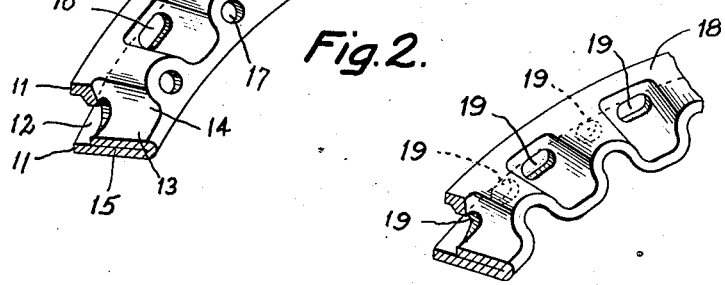
Figure 2 is a fragmentary perspective view of the inner periphery of the ring shown in Figure 1, along the lines 2—2, looking in the direction of the arrows.
Figure 3 is a fragmentary perspective view of the inner periphery of one modification; and, Figure 4 is a fragmentary perspective view of the inner periphery of another modification.

The ring 10, shown in Figures 1 and 2 of the drawing is of substantially U shaped cross section and having radially extending upper and lower sides or arms 11, arranged to form an annular channel 12, between their inner axial faces and the wall of the cylinder and having an outer axial face of one side provided with bosses or corrugations at annularly spaced intervals. The bosses 13, are disposed inwardly of the outer periphery and have axially extending sides and are arranged to form grooves 14, in the outer axial face of one side and ridges 15, in its inner axial face. The grooves are provided with openings 16, and extend from the annular channel to the bottom of the groove in the piston. The inner periphery of the ring is provided with additional slots 17, intermediate the bosses to provide additional drainage capacity. The grooves provide additional means for lubricating the side walls of the groove in the piston and sides of the ring inwardly of its outer periphery so it will be freer to expand radially, and to decrease side wall and ring wear also to improve sealing action of the ring. The ridges of the corrugations being integral with one side of the ring and presenting a relatively wide seat to the opposite side cause little wear and tend to maintain a predetermined axially spaced arrangement of the sides over a comparatively long period of time insuring a long useful life of the ring.

In Figure 3, both outer axial faces of the sides of the ring 18, are provided with bosses or corrugations, each side having ridges seated on the inner axial face of the opposite side, and each having its outer axial face provided with oil receiving grooves. The grooves are provided with drainage slots 19, and both sides of the ring being provided with oil receiving grooves either may be placed adjacent to the lower side wall of the groove in the piston.

Figure 4:
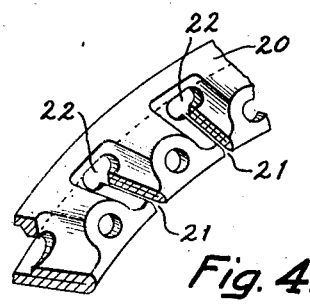

The ring 20, shown in Figure 4, has slits or slots 21, extending from the radially extending openings 22, in the bottom of the groove to the inner periphery of the ring, otherwise the ring is identical to the ring 10, Figure 1. The slits provide additional drainage space and increase the radial flexibility of the ring, also make the ring slightly axially compressible, so it is possible to use a ring of slightly greater axial width than that of the groove so that it will wedgingly engage its side walls and fit slightly oversize or worn grooves, and tend to conform to the shape of a worn cylinder and side walls.

In all modifications the grooves of the bosses provide additional oil receiving means in the bottom of the groove, and are so arranged that parts of the inner peripheral edges of the ring seat on the side walls of the groove and tend to prevent it from twisting therein when the piston reciprocates. In general the rings are constructed for use in combination with a radially expansible expander ring, so they may be made of practically any kind of ductile metal which best suits the particular engine, for example they may be made of aluminum which is light in weight, and causes little cylinder wear, also has good heat conductivity decreasing tendency of carbonizing oil.

In order to simplify the specification and drawing, only a few modifications have been shown, and I wish to be limited only by the scope of the appended claims, for example under some conditions it may prove desirable not to provide the grooves with radially extending openings in addition to those in the bottom of the ring, so the grooves will act as reservoirs tending to retain oil for lubricating the side walls, or to temporarily retain any excess which may not have had time to flow out the drain ducts in the piston.

I claim:

1. For use in a cylinder in combination with a reciprocating piston provided with a packing ring groove, a packing ring of substantially U shaped cross section having radially extending arms, one at least of said arms being provided with bosses having axially extending sides, said bosses being arranged to form ridges in the inner axial face and grooves in the outer axial face of said arm or arms, the ridges of the bosses on one arm being seated on the inner axial face of the opposite arm and said grooves having their outermost ends disposed inwardly of the outer periphery of said ring and extending to its inner periphery.

2. For use in a cylinder in combination with a reciprocating piston provided with a piston ring groove, a piston ring of substantially U shaped cross section having radially extending arms, one at least of said arms being provided with bosses having axially extending sides, said bosses being arranged to form ridges in the inner axial face and grooves in the outer axial face of said arm or arms, the ridges of the bosses on one arm being seated on the inner axial face of the opposite arm and said grooves having their outermost ends disposed inwardly of the outer periphery of said ring and provided with radially extending openings and extending to its inner periphery.

3. For use in a cylinder in combination with a reciprocating piston provided with a piston ring groove, a piston ring of substantially U shaped cross section and having radially extending axially corrugated sides, said corrugations being disposed inwardly of the outer periphery of said ring and being arranged to form grooves in the outer axial faces of said sides and said grooves having their outermost ends provided with radially extending openings and extending to the inner periphery of said ring.

4. For use in a cylinder in combination with a reciprocating piston provided with a piston ring groove, a substantially U shaped piston ring having radially extending upper and lower sides arranged to form an annular channel between their inner axial faces and the wall of said cylinder and having their outer axial faces provided with bosses arranged to form grooves therein and ridges in said inner axial faces, said grooves being disposed inwardly of the outer periphery of said sides and being provided with openings extending from said channel to the bottom of the groove in said piston.

5. For use in a cylinder in combination with a reciprocating piston provided with a piston ring groove, a substantially U shaped piston ring having radially extending upper and lower sides arranged to form an annular channel between their inner axial faces and the wall of said cylinder and having their outer axial faces provided with bosses arranged to form grooves therein and ridges in said inner axial faces, said bosses being disposed inwardly of the outer periphery of said ring and the ridges of each of said sides being seated on the opposite side and said grooves having their outermost ends provided with radially extending openings.

6. For use in a cylinder in combination with a reciprocating piston provided with a piston ring groove, a piston ring of substantially U shaped cross section having radially extending arms, one at least of said arms being provided with bosses having axially extending sides, said bosses being arranged to form ridges in the inner axial face and grooves in the outer axial face of said arm or arms, the ridges of the bosses on one arm being seated on the inner axial face of the opposite arm and said grooves having their outermost ends disposed inwardly of the outer periphery of said ring and provided with slits extending radially to the inner periphery of the ring.

WILLIAM S. MASON.